(12) United States Patent
Kaneko

(10) Patent No.: US 9,644,577 B2
(45) Date of Patent: May 9, 2017

(54) FUEL VAPOR LEAKAGE DETECTION DEVICE

(71) Applicant: DENSO CORPORATION, Kariya, Aichi-pref. (JP)

(72) Inventor: Makoto Kaneko, Novi, MI (US)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 14/524,317

(22) Filed: Oct. 27, 2014

(65) Prior Publication Data
US 2015/0135805 A1    May 21, 2015

(30) Foreign Application Priority Data

Nov. 21, 2013  (JP) ................................ 2013-241017

(51) Int. Cl.
*F02M 25/08* (2006.01)
*G01M 3/26* (2006.01)

(52) U.S. Cl.
CPC .......... *F02M 25/0818* (2013.01); *G01M 3/26* (2013.01)

(58) Field of Classification Search
CPC ................................ G01M 3/26; F02M 25/08
See application file for complete search history.

(56) References Cited

U.S. PATENT DOCUMENTS

| 2005/0044938 A1* | 3/2005 | Tsuruta | F02M 25/0818 73/114.41 |
| 2006/0016253 A1* | 1/2006 | Kobayashi | F02M 25/0818 73/114.39 |
| 2008/0092858 A1* | 4/2008 | Satoh | F02M 25/089 123/520 |
| 2008/0261065 A1 | 10/2008 | Fujimoto et al. | |
| 2012/0130596 A1* | 5/2012 | Ooiwa | B60K 15/03519 701/45 |
| 2012/0132179 A1 | 5/2012 | Kobayashi et al. | |

FOREIGN PATENT DOCUMENTS

| JP | H08-94590 A | 4/1996 |
| JP | 2005-69103 A | 3/2005 |
| JP | 2009-262576 A | 11/2009 |
| JP | 2010-168956 A | 8/2010 |

OTHER PUBLICATIONS

Office Action issued Nov. 17, 2015 in corresponding JP Application No. 2013-241017.

* cited by examiner

*Primary Examiner* — Robert Huber
*Assistant Examiner* — John M Royston

(57) ABSTRACT

A first housing has a canister passage communicating a first interior with a canister. A second housing has an atmospheric passage communicating a second interior with an atmosphere. A switching valve is accommodated in the first housing to switch communication of the canister passage with selectively one of a pressure detection passage and the atmospheric passage. A switching valve bypass passage communicates the canister passage with the pressure detection passage and bypasses the switching valve. A partition member separates the first interior from the second interior and has a communication hole communicating the first interior with the second interior. A contact member is equipped to an end of the partition member and is in contact with at least one of the first housing and the second housing. The partition member forms a clearance with the first housing and the second housing.

4 Claims, 7 Drawing Sheets

FUEL VAPOR LEAKAGE DETECTION DEVICE

CROSS REFERENCE TO RELATED APPLICATION

This application is based on reference Japanese Patent Application No. 2013-241017 filed on Nov. 21, 2013, the disclosure of which is incorporated herein by reference.

TECHNICAL FIELD

The present disclosure relates to a fuel vapor leakage detection device.

BACKGROUND

Conventionally, a known fuel vapor leakage detection device may be configured to detect leakage of fuel vapor, which is from a fuel tank and/or from a canister, which is to adsorb fuel vapor caused in a fuel tank. The fuel vapor leakage detection device includes, for example, a pump, a switching valve, and an air filter. The pump is to pressurize an interior of both a fuel tank and a canister or to reduce pressure in the fuel tank and the canister. The switching valve is to switch between communication of both the fuel tank and the canister with the pump and communication of both the fuel tank and the canister with the atmosphere. The air filter is to remove foreign matter contained in air drawn with the pump from the atmosphere. The fuel vapor leakage detection device includes two housings, each of which is in a bottomed tubular shape and is formed of resin. The two housings accommodate the pump, the switching valve, and the air filter. The fuel vapor leakage detection device is manufactured by, for example, implementing laser welding disclosed in, for example, Patent Document 1 on two resin members to connect the two resin members to form a housing and to maintain an airtight property of an interior of the housing to the outside.

(Patent Document 1)

Publication of unexamined Japanese patent application No. 2009-262576

The laser welding described in Patent Document 1 is implemented on the resin members, and one of the resin members has a stopper surface, which is in addition to a portion to be welded by laser. The stopper surface is to define a distance between the one resin member and the other resin member. When the two resin members are joined together with the laser welding, the one of the resin members is in contact with the other of the resin members at the portion, which is welded by laser, and at the stopper surface. The pump, the switching valve, and the like may be connected with the one resin member. Therefore, in the configuration of the housing manufactured by using the laser welding according to Patent Document 1, oscillation of the pump and/or the like may be propagated via the stopper surface to the other resin member easily. Consequently, the configuration may cause large noise.

SUMMARY

It is an object of the present disclosure to produce a fuel vapor leakage detection device configured to reduce noise caused by propagation of oscillation between components.

According to an aspect of the present disclosure, a fuel vapor leakage detection device is configured to detect leakage of fuel vapor from at least one of a canister and a fuel tank. The canister is configured to adsorb fuel vapor in a fuel tank. The fuel vapor leakage detection device comprises a first housing having a first interior and a canister passage. The canister passage is configured to communicate the first interior with the canister. The fuel vapor leakage detection device further comprises a second housing having a second interior, a second connection surface, and an atmospheric passage. The second connection surface is connected with a first connection surface of the first housing. The atmospheric passage is configured to communicate the second interior with an atmosphere. The fuel vapor leakage detection device further comprises a pressure detection passage formation member forming a pressure detection passage configured to communicate with the canister passage. The fuel vapor leakage detection device further comprises a switching valve accommodated in the first housing. The switching valve is configured to switch selectively between communication of the canister passage with the pressure detection passage and communication of the canister passage with the atmospheric passage. The fuel vapor leakage detection device further comprises a pressurizing and depressurizing unit accommodated in the first housing. The pressurizing and depressurizing unit selectively configured to pressurize or depressurize an interior of at least one of the fuel tank and the canister, when the switching valve communicates the canister passage with the pressure detection passage. The fuel vapor leakage detection device further comprises a bypass passage formation member configured to form a switching valve bypass passage, which is configured to communicate the canister passage with the pressure detection passage and to bypass the switching valve. The fuel vapor leakage detection device further comprises a throttle portion equipped to the bypass passage formation member. The fuel vapor leakage detection device further comprises a pressure detection unit configured to detect a pressure in the pressure detection passage and to send a signal according to the pressure in the pressure detection passage as detected. The fuel vapor leakage detection device further comprises an air filter accommodated in the second housing. The air filter is configured to capture foreign matter, which is contained in air drawn with the pressurizing and depressurizing unit into at least one of the fuel tank and the canister. The fuel vapor leakage detection device further comprises a partition member located between the first housing and the second housing. The partition member separates the first interior of the first housing from the second interior of the second housing. The partition member has a communication hole configured to communicate the first interior with the second interior. The fuel vapor leakage detection device further comprises a contact member equipped to an end of the partition member. The contact member is in contact with at least one of the first housing and the second housing. The partition member forms a clearance with the first housing and the second housing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, embodiments of the present disclosure will be described with reference to drawings.

First Embodiment

Figure 1:
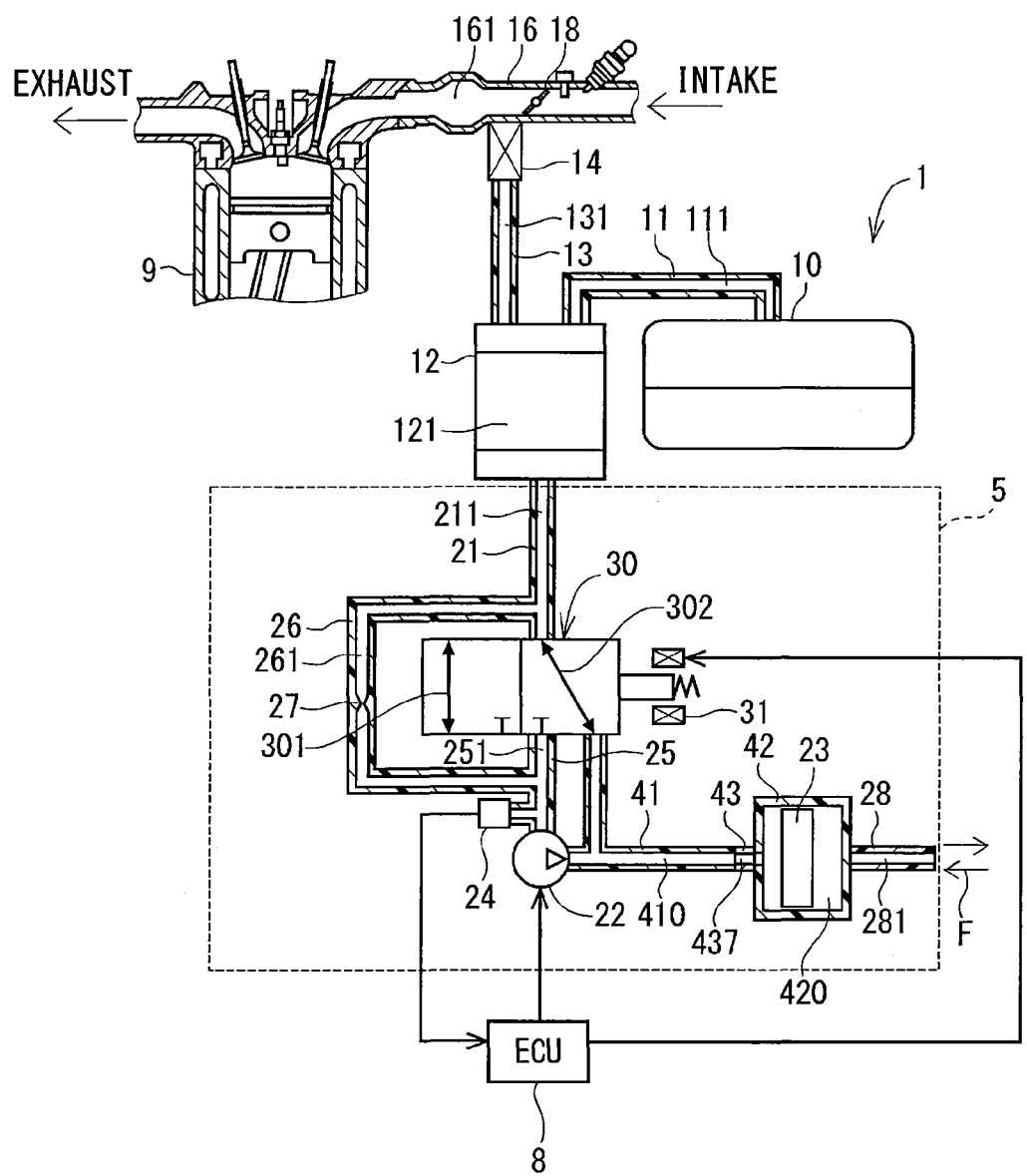
FIG. 1 is a diagram showing a vapor fuel processing apparatus employing a fuel vapor leakage detection device according to a first embodiment of the present disclosure.
Figure 2:
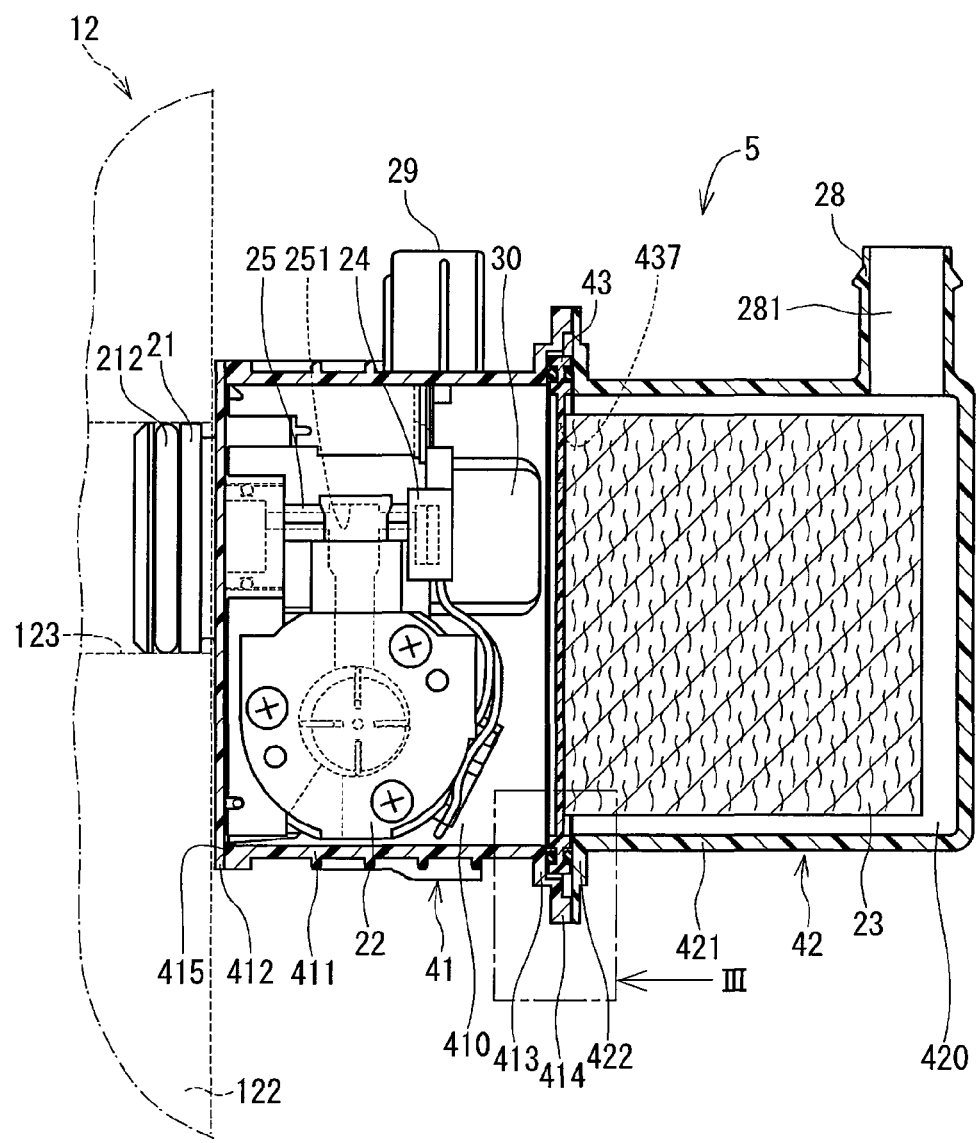
FIG. 2 is a sectional view showing the fuel vapor leakage detection device according to the first embodiment of the present disclosure.
Figure 3:
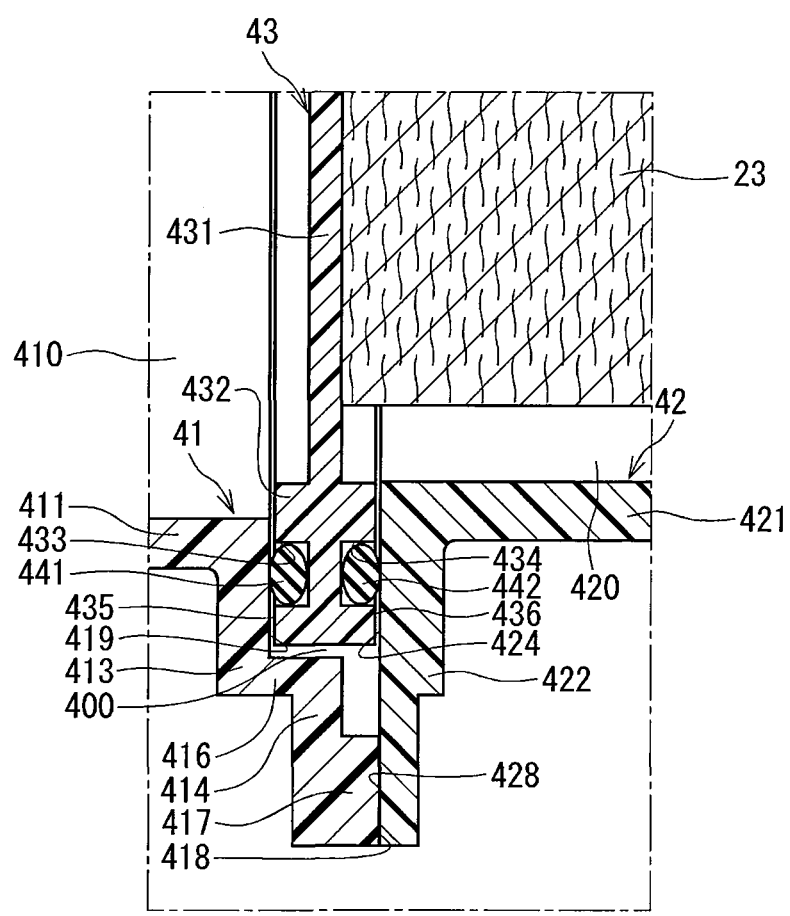
FIG. 3 is an enlarged view showing a portion III encircled by the chain line in FIG. 2.

FIGS. 1 to 3 show a fuel vapor leak detection device according to a first embodiment of the present disclosure.

A vapor fuel processing apparatus 1 shown in FIG. 1 includes a fuel tank 10, a canister 12, a fuel vapor leakage detection device 5, an ECU 8, and/or the like. In the vapor fuel processing apparatus 1, the canister 12 recovers vapor fuel caused in the fuel tank 10. The canister 12 purges recovered fuel vapor into an intake passage 161. The intake passage 161 is formed in an intake pipe 16, which is connected to an engine 9.

The fuel tank 10 stores fuel to be supplied to the engine 9. The fuel tank 10 is connected with the canister 12 through a first purge pipe 11. The first purge pipe 11 forms a first purge passage 111. The first purge passage 111 communicates an interior of the fuel tank 10 with an interior of the canister 12.

The canister 12 includes a canister adsorption material 121, which recovers vapor fuel caused in the fuel tank 10. Vapor fuel caused in the fuel tank 10 is drawn through the first purge passage 111 and absorbed with the canister adsorption material 121. Thus, the vapor fuel is recovered with the canister adsorption material 121. The canister 12 is connected with the intake pipe 16 through a second purge pipe 13. The second purge pipe 13 forms a second purge passage 131. The second purge pipe 13 is equipped with a purge valve 14. The purge valve 14 is a solenoid valve. The purge valve 14 defines an opening controlled to manipulate a quantity of vapor fuel, which is purged from the canister 12 to a downstream of a throttle valve 18 in the intake passage 161.

The fuel vapor leakage detection device 5 causes a pump 22 to pressurize and depressurize the interior of the fuel tank 10 and the interior of the canister 12. In this way, the fuel vapor leakage detection device 5 detects leakage of fuel vapor in the fuel tank 10, in the canister 12, in the first purge pipe 11, and/or in the second purge pipe 13. The pump 22 may function as a pressurizing and depressurizing unit. In the fuel vapor leakage detection device 5, air drawn into the canister 12 passes when fuel vapor, which is recovered with the canister 12, is purged into the intake pipe 16. Configuration of the fuel vapor leakage detection device 5 will be described later in detail.

The ECU 8 is configured with a microcomputer and/or the like including a CPU and a RAM and/or ROM. The CPU may function as a computation unit. The RAM and/or ROM may function as a storage unit. The ECU 8 is electrically connected with a pressure sensor 24 of the fuel vapor leakage detection device 5, the pump 22, and a coil 31. The pressure sensor 24 may function as a pressure detection unit. The ECU 8 further receives a signal according to pressure in a pressure detection passage 251, which is detected with the pressure sensor 24. The ECU 8 sends a signal to control a driving power of the pump 22. The ECU 8 further controls electricity supplied to a switching valve 30.

Subsequently, the fuel vapor leakage detection device 5 will be described with reference to FIGS. 2 and 3. As shown in FIG. 2, the fuel vapor leakage detection device 5 according to the first embodiment is configured with components including the pump 22, the switching valve 30, the pressure sensor 24, the air filter 23, and/or the like. The components of the fuel vapor leakage detection device 5 are modularized into one device and accommodated in a space formed with a first housing 41 and a second housing 42. A canister joint portion 21 is equipped to the first housing 41. A mount hole 123 is formed in a sidewall 122 of the canister 12. The fuel vapor leakage detection device 5 is mounted by fitting the canister joint portion 21 to the mount hole 123. The fuel vapor leakage detection device 5 is mounted such that the air filter 23 is located on the outside of the vehicle relative to the pump 22. The fuel vapor leakage detection device 5 is equipped to a lower portion of a vehicle body, such that the pump 22 is located on the side of a road.

The first housing 41 is a resin member in a bottomed tubular shape. The first housing 41 includes a tubular portion 411, a plate portion 412, a first flange portion 413, a second flange portion 414, and/or the like. The first housing 41 has an inner space 410 as an interior. The inner space 410 accommodates the pump 22, the switching valve 30, and the pressure sensor 24.

The tubular portion 411 is a tubular member formed of resin. The tubular portion 411 is equipped with a connector 29, which is electrically connectable with the ECU 8. The plate portion 412 is substantially in a plate shape and is formed of resin. The plate portion 412 is equipped to cover an opening 415 of the tubular portion 411 on one side. The plate portion 412 is equipped with the canister joint portion 21. The canister joint portion 21 has a radially outer side equipped with an O-ring 212. The O-ring 212 is in contact with an inner wall of the mount hole 123.

The first flange portion 413 is located on the opposite side of the tubular portion 411 from the plate portion 412. The first flange portion 413 is substantially in an annular shape and extends along the periphery of the tubular portion 411. The outer diameter of the first flange portion 413 is greater than the outer diameter of the tubular portion 411. The first flange portion 413 has a radially outer side equipped with a first annular portion 416. The first annular portion 416 extends toward the second housing 42. The second flange portion 414 is connected with an end of the first annular portion 416 on the side of the second housing 42. The outer diameter of the second flange portion 414 is greater than the outer diameter of the first flange portion 413. The second flange portion 414 has a radially outer side equipped with a second annular portion 417. The second annular portion 417 extends toward the second housing 42. The second annular portion 417 has a wall surface 418 on the side of the second housing 42. The wall surface 418 may be equivalent to a first connection surface. The wall surface 418 is in contact with the second housing 42.

The second housing 42 is a resin member in a bottomed tubular shape. The second housing 42 includes a bottomed tubular portion 421, a flange portion 422, and/or the like.

The second housing 42 has an inner space 420 as an interior. The inner space 420 accommodates an air filter 23.

The bottomed tubular portion 421 is formed of resin and is in a bottomed tubular shape. The bottomed tubular portion 421 has a bottom portion equipped with an atmospheric passage forming portion 28. The atmospheric passage forming portion 28 forms an atmospheric passage 281, which communicates the inner space 420 with the atmosphere outside the second housing 42.

The flange portion 422 is equipped to an end of the bottomed tubular portion 421 on the side of the opening. The flange portion 422 is substantially in an annular shape and extends along the periphery of the bottomed tubular portion 421. The flange portion 422 has a wall surface on the side of the first housing 41, and the wall surface includes a wall surface 428 located on the radially outside. The wall surface 428 may be equivalent to a second connection surface. The wall surface 428 is in contact with the wall surface 418 of the second annular portion 417 of the first housing 41.

A partition member 43 is equipped between the first housing 41 and the second housing 42. Specifically, the partition member 43 is fitted to a groove 400. The groove 400 is located between the first housing 41 and the second housing 42. The groove 400 is defined by the first flange portion 413, the first annular portion 416, the second flange portion 414, and the second annular portion 417 of the first housing 41. The groove 400 maybe equivalent to a first accommodation groove. The partition member 43 separates the inner space 410 from the inner space 420. In addition, the partition member 43 restricts water, air, and dust, which are in the inner space 420, from passing through the air filter 23 into the inner space 410. The partition member 43 includes a plate portion 431 and a periphery 432. The periphery 432 is formed on a radially outer end of the plate portion 431. The periphery 432 functions as an end.

The plate portion 431 is in a plate shape. The plate portion 431 has a communication hole 437, which is located at a position relatively distant from the pump 22. The communication hole 437 communicates the inner space 410 with the inner space 420.

The periphery 432 has two grooves. One of the two grooves is a groove 433, which is formed on the side of the first housing 41. The groove 433 is equipped with a seal member 441. The seal member 441 is in contact with a wall surface 419 of the first flange portion 413 of the first housing 41. The seal member 441 may be equivalent to a contact member. The seal member 441 is formed of an elastic material such as rubber. To the contrary, a wall surface 435 of the periphery 432, which is on the side of the first housing 41, and the wall surface 419 of the first flange portion 413, which is opposed to the wall surface 435, form a clearance therebetween. The other of the two grooves is a groove 434, which is formed on the side of the second housing 42. The groove 434 is equipped with a seal member 442. The seal member 442 is in contact with the wall surface 428 of the flange portion 422 of the second housing 42. The seal member 442 may be equivalent to a contact member. The seal member 442 is formed of an elastic material such as rubber. The flange portion 422 of the second housing 42 has a wall surface 424, which is different from the wall surface 428. A wall surface 436 of the periphery 432, which is on the side of the second housing 42, and the wall surface 424 form a clearance therebetween.

The first housing 41 and second housing 42 are connected to each other by, for example, laser welding the wall surface 418 with the wall surface 428. The present configuration enables to maintain airtight isolation of both the inner space 410 and the inner space 420 from external atmosphere. In addition, the seal member 441 enables to maintain airtight isolation of the inner space 410 from the outside. Furthermore, the seal member 442 enables to maintain airtight isolation of the inner space 420 from the outside.

The pump 22 is equipped in the inner space 410 and is located on the side of the plate portion 412. The pump 22 is, for example, a vane pump. Referring to FIG. 1, the pump 22 is connected with the switching valve 30 through a pressure detection pipe 25. The pressure detection pipe 25 is equipped with the pressure sensor 24. The pressure detection pipe 25 may be equivalent to a pressure detection passage formation member. The pump 22 draws vapor in the fuel tank 10 through the pressure detection pipe 25, the switching valve 30, the canister joint portion 21, the canister 12, and the first purge pipe 11. In this way, the pump 22 reduces pressure of the interior of the fuel tank 10. In the present state, the pressure sensor 24 equipped to the pressure detection pipe 25 detects pressure in the pressure detection passage 251 thereby to detect pressure in the fuel tank 10. The pressure sensor 24 may be equivalent to a pressure detection unit.

The switching valve 30 is equipped in the inner space 410 and is located on the side of the plate portion 412. The switching valve 30 is, for example, a solenoid valve. The switching valve 30 is configured to communicate a canister passage 211 with the atmospheric passage 281 through the inner spaces 410 and 420 or to communicate the canister passage 211 with the pressure detection passage 251 through the inner spaces 410 and 420, according to electricity supply from the ECU 8. Specifically, as shown in FIG. 1, when electric current is not supplied to the switching valve 30, the switching valve 30 communicates the canister passage 211 with the atmospheric passage 281. Alternatively, when electric current is supplied to the switching valve 30, the switching valve 30 communicates the canister passage 211 with the pressure detection passage 251. In the present example, the switching valve 30 forms a switching valve passage 302 when the canister passage 211 is communicated with the atmospheric passage 281. The switching valve 30 further forms a switching valve passage 301 when the canister passage 211 is communicated with the pressure detection passage 251.

Regardless of electricity supply to the switching valve 30, the canister passage 211 is communicated with the pressure detection passage 251 through a switching valve bypass passage 261, which is formed in a bypass passage pipe 26. The bypass passage pipe 26 may be equivalent to a bypass passage formation member. The switching valve bypass passage 261 is equipped with a reference orifice 27. The reference orifice 27 may be equivalent to a throttle portion. The reference orifice 27 has an inner diameter, which corresponds to a hole size defining an upper limit of an allowable quantity of leakage of gas, which includes vapor fuel from the fuel tank 10.

The air filter 23 is accommodated in the second housing 42. Gas in the fuel tank 10 or gas in the canister 12 is discharged through the air filter 23 to the external atmosphere when the canister 12 adsorbs fuel vapor, when the pump 22 reduces pressure in the fuel tank 10, or when fuel is supplied into the fuel tank 10. To the contrary, air is drawn from the external atmosphere through the air filter 23 into the fuel vapor leakage detection device 5 when fuel vapor, which is absorbed in the canister 12, is supplied into the intake pipe 16. In the present state, the air filter 23 captures foreign matter included in the drawn air. In FIG. 1, an arrow F represents a flow of gas containing air.

Subsequently, an operation of the fuel vapor leakage detection device 5 according to the embodiment will be described. The fuel vapor leakage detection device 5 causes the pump 22 to reduce pressure in the fuel tank 10 thereby to implement a fuel vapor leakage detection processing to detect leakage of fuel vapor in the fuel tank 10.

More specifically, when a predetermined time period elapses after termination of the engine 9 of the vehicle, a soak timer (not shown) activates the ECU 8. Thus, the ECU 8 starts the fuel vapor leakage detection processing for the fuel tank 10. In the detection, the atmospheric pressure is detected to correct an error caused according to the altitude at which the vehicle is parked. When electricity is not supplied to the coil 31, the atmospheric passage 281 is communicated with the canister passage 211 through the inner spaces 420 and 410 and the switching valve 30. In addition, the canister passage 211 is communicated with the pressure detection passage 251 through the switching valve bypass passage 261. That is, the pressure detection passage 251 is communicated with the atmosphere. Therefore, the pressure sensor 24 equipped to the pressure detection pipe 25 is enabled to detect the atmospheric pressure. When completing detection of the atmospheric pressure, the ECU 8 calculates the altitude, at which the vehicle is parked, according to the detected pressure.

Subsequently, electricity is supplied to the pump 22 to reduce pressure in the pressure detection passage 251. In this way, air in the inner space 410 flows through the switching valve passage 302, the canister passage 211, and the switching valve bypass passage 261, into the pressure detection passage 251. The reference orifice 27 throttles air, which flows into the pressure detection passage 251. Therefore, pressure in the pressure detection passage 251 decreases. Pressure in the pressure detection passage 251 decreases to a predetermined pressure, which corresponds to an opening area of the reference orifice 27, and subsequently becomes constant. The pressure detected with the pressure detection passage 251 is stored as a reference pressure.

When the reference pressure is detected, electricity is supplied to the coil 31 of the switching valve 30. In this way, the switching valve 30 blocks the canister passage 211 from the atmospheric passage 281, and the switching valve 30 communicates the canister passage 211 with the pressure detection passage 251. Thus, the fuel tank 10 is communicated with the pressure detection passage 251, thereby to equalize pressure in the pressure detection passage 251 with pressure in the fuel tank 10.

The communication between the canister passage 211 and the pressure detection passage 251 enables the pump 22 to reduce pressure in the fuel tank 10. In a case where continuous operation of the pump 22 enables to reduce pressure in the pressure detection passage 251, i.e., pressure in the fuel tank 10 to be lower than the reference pressure, which is previously detected, it is determined that leakage of gas, which includes fuel vapor, from the fuel tank 10 is less than or equal to an allowable quantity. That is, in a case where the pressure in the fuel tank 10 decreases to be lower than the reference pressure, air does not intrude from the outside into the fuel tank 10, or a quantity of air intruding into the fuel tank 10 is equal to or less than a quantity of air capable of passing through the reference orifice 27. Therefore, it is determined that the airtight property of the fuel tank 10 is sufficiently secured.

To the contrary, in a case where pressure in the fuel tank 10 does not decrease to the reference pressure, it is determined that leakage of gas, which includes fuel vapor, from the fuel tank 10 is greater than the allowable quantity. That is, in a case where pressure in the fuel tank 10 does not decrease to the reference pressure, it is conceivable that air intrudes into the fuel tank 10 from the outside as pressure in the fuel tank 10 is reduced. Therefore, it is determined that the airtight property of the fuel tank 10 is not secured sufficiently.

On completion of the detection of leakage of gas, which includes fuel vapor, electricity supply to the switching valve 30 is terminated, and the reference pressure is confirmed (detected) again. Subsequently, electricity supply to the pump 22 is terminated. The ECU 8 detects recovery of pressure, which is detected with the pressure detection passage 251, to the atmospheric pressure. Subsequently, the ECU 8 terminates operation of the pressure sensor 24 and terminates the fuel vapor leakage detection processing.

In the fuel vapor leakage detection device 5 according to first embodiment, the second housing 42 and the air filter 23 are located on the outside of the pump 22 and the switching valve 30 from the vehicle. In order to reduce noise propagated to an ear of a user outside the vehicle, it is necessary to restrict propagation of operation sound of the pump 22 and the switching valve 30 to the second housing 42, which is located close to the user. Operation sound of the pump 22 and the switching valve 30, which are accommodated in the first housing 41, may be propagated, as oscillation, through gas in the inner space 410 to the partition member 43. In the present state, the partition member 43 may be configured to oscillate between the first housing 41 and the second housing 42 similarly to, for example, a membrane of a drum. The oscillation of the partition member 43 may occur in accordance with oscillation of gas in the inner space 410 caused by the operation sound of the pump 22 and the switching valve 30. The periphery 432 of the partition member 43 is connected with the first housing 41 and the second housing 42 via the seal members 441 and 442. In addition, the first housing 41, the second housing 42, and the partition member 43 form the clearance thereamong. The present configuration enables to cause the seal members 441 and 442 to attenuate oscillation of the partition member 43, thereby to reduce oscillation propagated directly to the second housing 42 and/or to reduce oscillation propagated indirectly via the first housing 41. In this way, the present configuration may enable to reduce noise.

In addition, the seal members 441 and 442 are supported by the partition member 43 and are further in contact with the first housing 41 and the second housing 42. The present configuration may enable to maintain an airtight property of the inner space 410 relative to the atmosphere outside thereof and to maintain an airtight property of the inner space 420 relative to the atmosphere outside thereof. In addition, the present configuration may enable to facilitate joining between the first housing 41 and the second housing 42. It is noted that, a conceivable configuration may be opted. Specifically, in the conceivable configuration, the seal member 441 may be in contact with both the periphery 432 of the partition member and the wall surface 419 at its entire circumferential periphery, and the seal member 442 may be in contact with both the periphery 432 of the partition member and the wall surface 424 at its entire circumferential periphery. In case of the conceivable configuration, the wall surface 428 and the wall surface 418 may be in contact with each other selectively at, for example, four corners in its rectangular periphery, not at its entire circumferential periphery. The conceivable configuration may reduce a manufacturing process of the fuel vapor leakage detection device 5.

Second Embodiment

Figure 4:
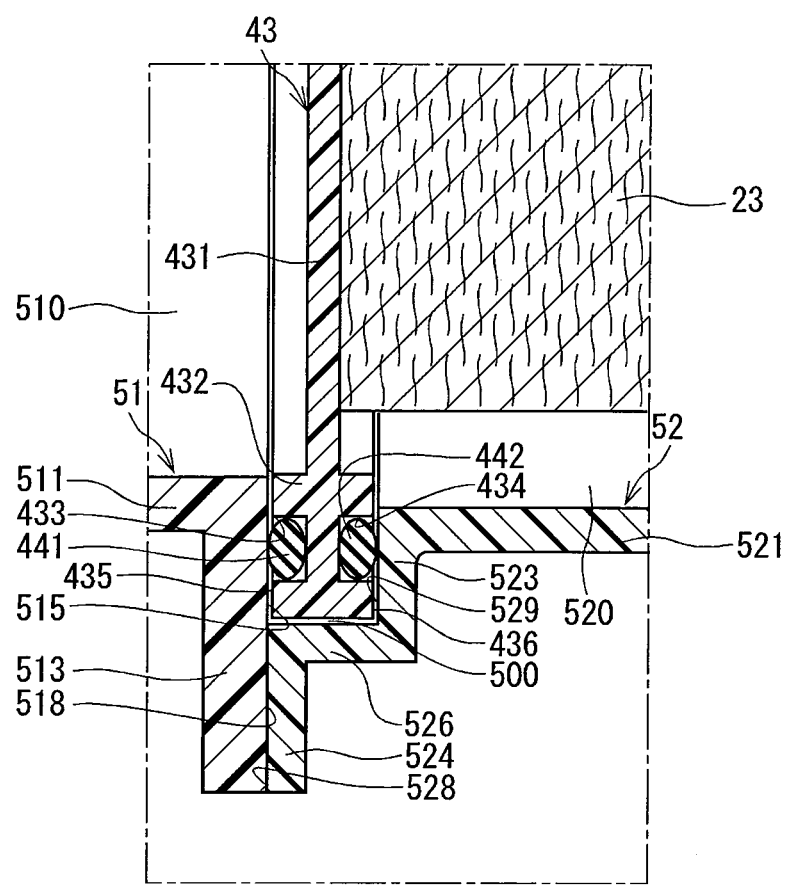
FIG. 4 is a sectional view showing a portion of the fuel vapor leakage detection device according to a second embodiment of the present disclosure.

Subsequently, a fuel vapor leakage detection device according to the second embodiment of the present disclosure will be described with reference to FIG. 4. The second embodiment employs a partition member at a position different from the position of the partition member exemplified in the first embodiment.

The fuel vapor leakage detection device according to second embodiment includes a first housing 51 including a tubular portion 511, a plate portion, a flange portion 513, and/or the like. The tubular portion 511 is equipped with the connector 29. The plate portion is equipped to cover one opening of the tubular portion 511. The first housing 51 has an inner space 510 as an interior. The inner space 510 accommodates the pump 22, the switching valve 30, and the pressure sensor 24.

The flange portion 513 is equipped to an end of the tubular portion 511 on the side of the other opening. The flange portion 513 is substantially in an annular shape and extends along the periphery of the tubular portion 511. The flange portion 513 has a wall surface on the side of a second housing 52, and the wall surface includes a wall surface 518 located on the radially outside. The wall surface 518 may be equivalent to a first connection surface. The wall surface 518 is in contact with the second housing 52.

The second housing 52 includes a bottomed tubular portion 521, a first flange portion 523, a second flange portion 524, and/or the like. The bottomed tubular portion 521 is in a bottomed tubular shape and is formed of resin. The second housing 52 has an inner space 520 as an interior. The inner space 520 accommodates the air filter 23.

The first flange portion 523 is equipped to an end of the bottomed tubular portion 521 on the side of the opening. The first flange portion 523 is substantially in an annular shape and extends along the periphery of the bottomed tubular portion 521. The first flange portion 523 has an outer diameter greater than an outer diameter of the bottomed tubular portion 521. The first flange portion 523 has a radially outer side equipped with a first annular portion 526. The first annular portion 526 extends toward the first housing 51. The second flange portion 524 is connected with an end of the first annular portion 526 on the side of the first housing 51. The outer diameter of the second flange portion 524 is greater than the outer diameter of the first flange portion 523. The second flange portion 524 has a wall surface 528 on the side of the first housing 51. The wall surface 528 may be equivalent to a second connection surface. The wall surface 528 is in contact with the wall surface 518 of the flange portion 513 of the first housing 51.

The partition member 43 is fitted to a groove 500. The groove 500 is located between the first housing 51 and the second housing 52. The groove 500 is defined with the first flange portion 523 of the second housing 52 and the first annular portion 526. The groove 500 may be equivalent to a second accommodation groove. The periphery 432 of the partition member 43 has the wall surface 435 on the side of the first housing 41. The flange portion 513 of the first housing 51 has a wall surface 515, which is different from the wall surface 518. The wall surface 515 is opposed to the wall surface 435. The wall surface 435 and the wall surface 515 form a clearance therebetween. The periphery 432 has the wall surface 436 on the side of the second housing 52. The first flange portion 523 of the second housing 52 has a wall surface 529. The wall surface 529 is opposed to the wall surface 436. The wall surface 436 and the wall surface 529 form a clearance therebetween.

In the fuel vapor leakage detection device according to the second embodiment, oscillation is propagated via gas in the inner space 510 to the partition member 43, and the oscillation is attenuated with the seal members 441 and 442. The present configuration may enable to restrict propagation of oscillation of the partition member 43 to the first housing 51 and the second housing 52. Therefore, the fuel vapor leakage detection device according to the second embodiment may produce an effect similarly to the first embodiment.

Third Embodiment

Figure 5:
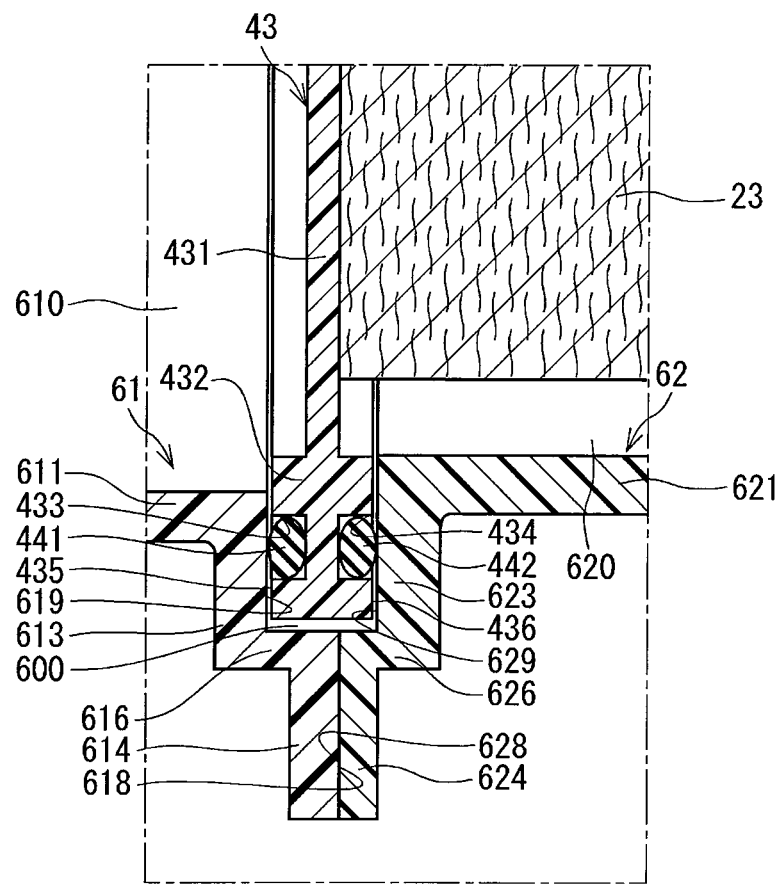
FIG. 5 is a sectional view showing a portion of the fuel vapor leakage detection device according to a third embodiment of the present disclosure.

Subsequently, a fuel vapor leakage detection device according to the third embodiment of the present disclosure will be described with reference to FIG. 5. The partition member according to the third embodiment is accommodated at a position different from the position of the partition member according to the first embodiment.

The fuel vapor leakage detection device according to the third embodiment includes a first housing 61, which is in a bottomed tubular shape and is formed of a resin. The first housing 61 includes a tubular portion 611, a plate portion, a first flange portion 613, a second flange portion 614, and/or the like. The tubular portion 611 is equipped with the connector 29. The plate portion is equipped to cover one opening of the tubular portion 611. The first housing 61 has an inner space 610 as an interior. The inner space 610 accommodates the pump 22, the switching valve 30, and a pressure sensor 240.

The first flange portion 613 is equipped to an end of the tubular portion 611 on the opposite side of the plate portion. The first flange portion 613 is substantially in an annular shape and extends along the periphery of the tubular portion 611. The outer diameter of the first flange portion 613 is greater than the outer diameter of the tubular portion 611. The first flange portion 613 is equipped with a first annular portion 616 on the radially outside. The first annular portion 616 extends toward a second housing 62. The second flange portion 614 is equipped to an end of the first annular portion 616 on the side of the second housing 62. The outer diameter of the second flange portion 614 is greater than the outer diameter of the first flange portion 613. The second flange portion 614 has a wall surface 618 on the side of the second housing 62. The wall surface 618 is in contact with the second housing 62. The wall surface 618 may be equivalent to a first connection surface.

The second housing 62 includes a bottomed tubular portion 621, a first flange portion 623, a second flange portion 624, and/or the like. The bottomed tubular portion 621 is in a bottomed tubular shape and is formed of resin. The second housing 62 has an inner space 620 as an interior. The air filter 23 is accommodated in the inner space 620.

The first flange portion 623 is equipped to an end of the bottomed tubular portion 621 on the side of the opening. The first flange portion 623 is substantially in an annular shape and extends along the periphery of the bottomed tubular portion 621. The outer diameter of the first flange portion 623 is greater than the outer diameter of the bottomed tubular portion 621. The first flange portion 623 is equipped with a first annular portion 626 on the radially outside. The first annular portion 626 extends toward the first housing 61. The second flange portion 624 is connected with an end of the first annular portion 626 on the side of the first housing 61. The outer diameter of the second flange portion 624 is greater than the outer diameter of the first flange portion 623. The second flange portion 624 has a wall surface 628 on the side of the first housing 61. The wall surface 628 is in contact with the wall surface 618 of the second flange portion 614 of the first housing 61. The wall surface 628 may be equivalent to a second connection surface.

The partition member 43 is fitted to a groove 600. The groove 600 is located between the first housing 61 and the second housing 62. The groove 600 is defined among the first flange portion 613 of the first housing 61, the first annular portion 616, the first flange portion 623 of the second housing 62, and the first annular portion 626. The groove 600 may be equivalent to a third accommodation groove. The periphery 432 of the partition member 43 has the wall surface 435 on the side of the first housing 41. The first flange portion 613 of the first housing 51 has a wall surface 619. The wall surface 619 is opposed to the wall surface 435. The wall surface 435 and the wall surface 619 form a clearance therebetween. The periphery 432 has the wall surface 436 on the side of the second housing 62. The first flange portion 623 of the second housing 52 has a wall surface 629, which is opposed to the wall surface 436. The wall surface 436 and the wall surface 629 form a clearance therebetween.

In the fuel vapor leakage detection device according to the third embodiment, oscillation is propagated via gas in the inner space 510 to the partition member 43, and the oscillation is attenuated with the seal members 441 and 442. The present configuration may enable to restrict propagation of oscillation of the partition member 43 to the first housing 61 and the second housing 62. Therefore, the fuel vapor leakage detection device according to the third embodiment may produce an effect similarly to the first embodiment.

Fourth Embodiment

Figure 6:
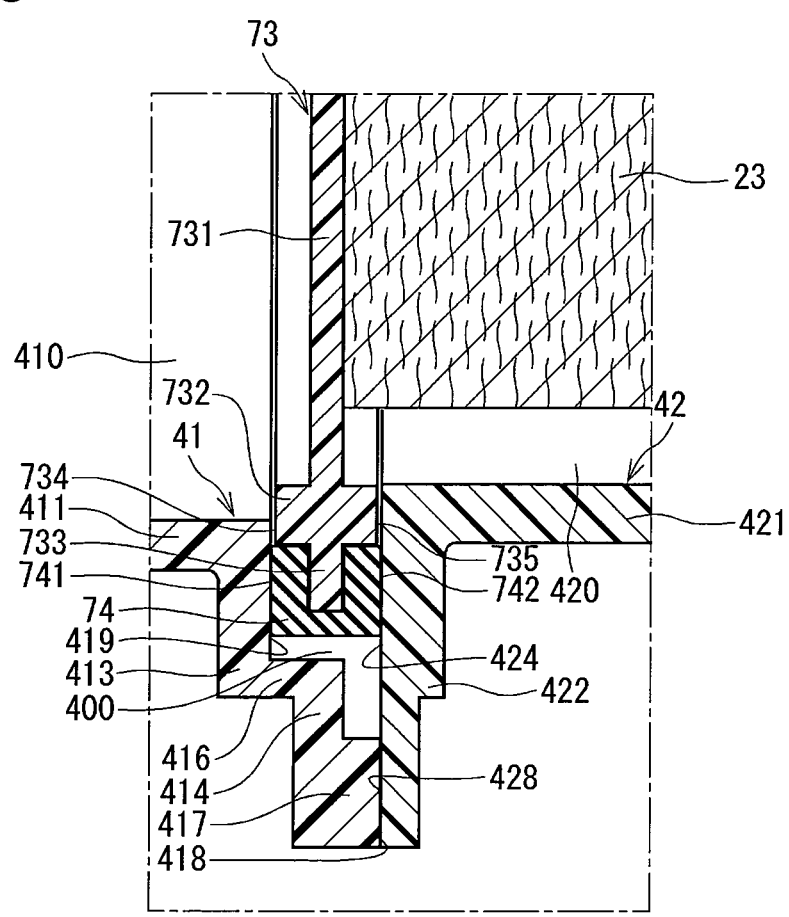
FIG. 6 is a sectional view showing a portion of the fuel vapor leakage detection device according to a fourth embodiment of the present disclosure.

Subsequently, a fuel vapor leakage detection device according to the fourth embodiment of the present disclosure will be described with reference to FIG. 6. According to the fourth embodiment, the shape of a partition member and the shape of a seal member are different from those of the first embodiment.

The fuel vapor leakage detection device according to the fourth embodiment includes a partition member 73 including a plate portion 731, a first periphery 732, and a second periphery 733. The plate portion 731 is in a plate shape. The second periphery 733 may be equivalent to an end. The partition member 73 is fitted to the groove 400. The groove 400 is located between the first housing 41 and the second housing 42. The groove 400 is defined among the first flange portion 413 of the first housing 41, the first annular portion 416, the second flange portion 414, and the second annular portion 417.

The plate portion 731 is formed in a plate shape. The plate portion 731 has a through hole, which communicates the inner space 410 with the inner space 420. The first periphery 732 is equipped to a periphery of the plate portion 731 on the radially outside. The thickness of the first periphery 732 is greater than the thickness of the plate portion 731 in a direction from the first housing 41 to the second housing 42. The first periphery 732 has a wall surface 734 on the side of the first housing 41. The first flange portion 413 of the first housing 41 has the wall surface 419. The wall surface 419 is opposed to the wall surface 734. The wall surface 734 and the wall surface 419 form a clearance therebetween. The first periphery 732 has a wall surface 735 on the side of the second housing 42. The flange portion 422 of the second housing 42 has the wall surface 424, which is different from the wall surface 428. The wall surface 424 is opposed to the wall surface 735. The wall surface 735 and the wall surface 424 form a clearance therebetween.

The second periphery 733 is projected radially outward from the first periphery 732. The second periphery 733 supports a seal member 74. The seal member 74 is in a bottomed tubular shape. The seal member 74 may be equivalent to a contact member.

The seal member 74 is formed of an elastic material, such as rubber. The seal member 74 has a wall surface 741 on the side of the first housing 41. The wall surface 741 is in contact with the wall surface 419 of the first flange portion 413 of the first housing 41. The seal member 74 has a wall surface 742 on the side of the second housing 42. The wall surface 742 is in contact with the wall surface 424 of the flange portion 422 of the second housing 42.

In the fuel vapor leakage detection device according to the fourth embodiment, oscillation is propagated via gas in the inner space 410 to the partition member 73, and the oscillation is attenuated with the seal member 74, which is in contact with the first housing 41 and the second housing 42. The present configuration may enable to restrict propagation of oscillation of the partition member 73 to the first housing 41 and the second housing 42. Therefore, the fuel vapor leakage detection device according to the fourth embodiment may produce an effect similarly to the first embodiment.

Fifth Embodiment

Figure 7:
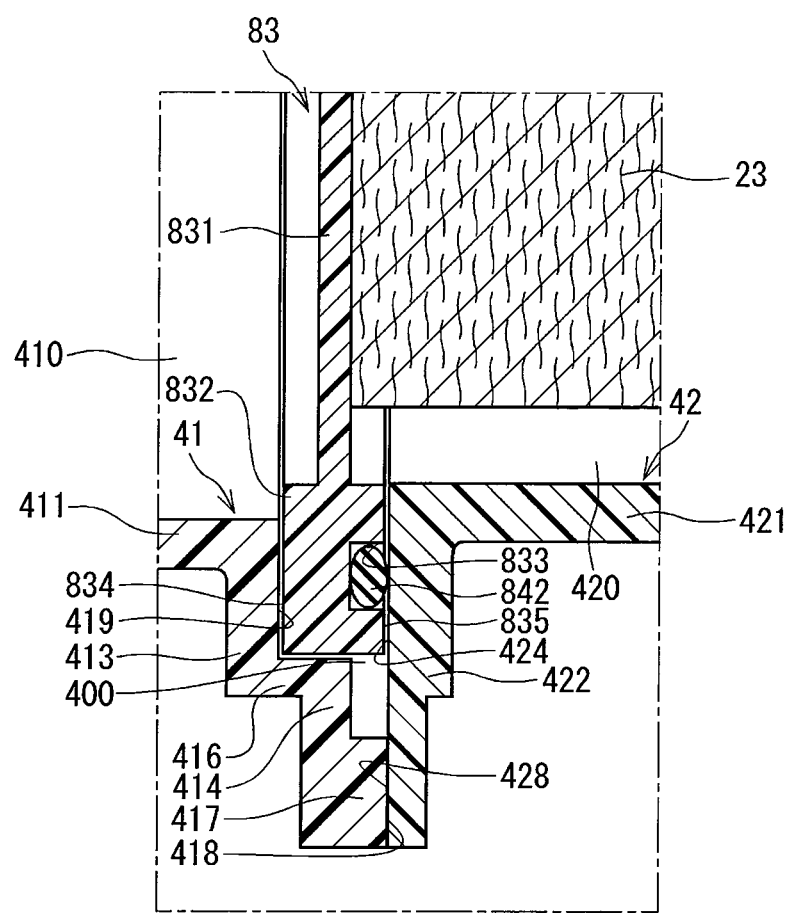
FIG. 7 is a sectional view showing a portion of the fuel vapor leakage detection device according to a fifth embodiment of the present disclosure.

Subsequently, a fuel vapor leakage detection device according to the fifth embodiment of the present disclosure will be described with reference to FIG. 7. According to the fifth embodiment, the shape of a partition member and the shape of a seal member are different from those of the first embodiment.

The fuel vapor leakage detection device according to the fifth embodiment includes a partition member 83 including a plate portion 831 and a periphery 832. The plate portion 831 is in a plate shape. The periphery 832 may be equivalent to an end. The partition member 83 is fitted to the groove 400. The groove 400 is located between the first housing 41 and the second housing 42. The groove 400 is defined among the first flange portion 413 of the first housing 41, the first annular portion 416, the second flange portion 414, and the second annular portion 417.

The plate portion 831 is in a plate shape. The plate portion 831 has a through hole, which communicates the inner space 410 with the inner space 420. The periphery 832 is equipped on the periphery of the plate portion 831. The periphery 832 has a singular groove 833 on the side of the second housing 42. The groove 833 is equipped with a seal member 842. The seal member 842 may be equivalent to a contact member. The seal member 842 is formed of an elastic material, such as rubber. The seal member 842 is in contact with the wall surface 424 of the flange portion 422 of the second housing 42. The periphery 832 has a wall surface 834 on the side of the first housing 41. The first flange portion 413 of the first housing 41 has the wall surface 419. The wall surface 419 is opposed to the wall surface 834. In the present state, the wall surface 834 and the wall surface 419 form a clearance therebetween. The periphery 832 has a wall surface 835 on the side of the second housing 42. The flange portion 422 of the second housing 42 has the wall surface 424. The wall surface 424 is opposed to the wall surface 835. The wall surface 835 and the wall surface 424 form a clearance therebetween.

In the fuel vapor leakage detection device according to the fifth embodiment, oscillation is propagated via gas in the inner space 410 to the partition member 83, and the oscillation is attenuated with the seal member 842, which is in contact with the second housing 42. The present configuration may enable to restrict propagation of oscillation of the partition member 83 to the second housing 42. Therefore, the fuel vapor leakage detection device according to the fifth embodiment may produce an effect similarly to the first embodiment.

Other Embodiments (a) In the above embodiments, the first housing and the second housing are joined to each other by laser welding. It is noted that, the joining method of the first housing to the second housing is not limited to the above-described example. The joining method may employ ultrasonic welding or may employ a joining method using adhesive.

(b) In the above embodiments, the pump is exemplified to reduce pressure in the fuel tank. It is noted that, the pump may pressurizes the interior of the fuel tank, thereby to detect leakage of fuel vapor.

The present disclosure relates to the fuel vapor leakage detection device configured to detect leakage of fuel vapor from at least one of the fuel tank and the canister. The canister is configured to adsorb fuel vapor in the fuel tank. The fuel vapor leakage detection device includes the first housing, the second housing, the pressure detection passage formation member, the switching valve, the pressurizing and depressurizing unit, the bypass passage formation member, the throttle portion, the pressure detection unit, the air filter, the partition member, and the contact member.

The first housing has the canister passage configured to communicate the interior (first interior) of the first housing with the canister. The second housing has the second connection surface and the atmospheric passage. The second connection surface is connected to the first connection surface of the first housing. The atmospheric passage is configured to communicate the interior (second interior) of the second housing with the atmosphere. The pressure detection passage formation member forms the pressure detection passage, which is configured to communicate with the canister passage. The switching valve is accommodated in the first housing. The switching valve is configured to switch selectively between communication of the canister passage with the pressure detection passage and communication of the canister passage with the atmospheric passage. The pressurizing and depressurizing unit is accommodated in the first housing. The pressurizing and depressurizing unit is configured to pressurize and depressurize the interior of the fuel tank and/or the canister, when the switching valve communicates the canister passage with the pressure detection passage. The bypass passage formation member forms a switching valve bypass passage to bypass the switching valve and to communicate the canister passage with the pressure detection passage. The throttle portion is equipped to the bypass passage formation member. The pressure detection unit is configured to detect pressure in the pressure detection passage and to send a signal according to the pressure of the pressure detection passage as detected. The air filter is accommodated in the second housing. The air filter is configured to capture foreign matter contained in air, which is drawn with the pressurizing and depressurizing unit into the fuel tank and/or the canister. The partition member is equipped between the first housing and the second housing. The partition member has the communication hole, which communicates the interior of the first housing with the interior of the second housing. The partition member separates the interior of the first housing from the interior of the second housing. The contact member is equipped to the end of the partition member. The contact member is in contact with at least one of the first housing and the second housing. The partition member forms a clearance with the first housing and the second housing.

The fuel vapor leakage detection device according to the present disclosure includes the partition member. The partition member separates the interior of the first housing, which accommodates the pump, the switching valve, and/or the like, from the interior of the second housing, which accommodates the filter. The contact member is equipped to the end of the partition member. The contact member is in contact with at least one of the first housing and the second housing. To the contrary, the first housing and the second housing form the clearance with the partition member. The present configuration may enable the contact member to attenuate oscillation, which is cased when the pump and the switching valve are operated and is propagated via gas inside the first housing to the partition member. In this way, the present configuration may enable to restrict propagation of the oscillation to the first housing or the second housing. In this way, the present configuration may enable to reduce noise caused by oscillation propagated from the partition member to the first housing and/or the second housing.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel vapor leakage detection device configured to detect leakage of fuel vapor from at least one of a canister and a fuel tank, the canister configured to adsorb fuel vapor in a fuel tank, the fuel vapor leakage detection device comprising:
    a first housing having a first interior and a canister passage, the canister passage configured to communicate the first interior with the canister;
    a second housing having a second interior, a second connection surface, and an atmospheric passage, the second connection surface connected with a first connection surface of the first housing, the atmospheric passage configured to communicate the second interior with an atmosphere;
    a pressure detection passage formation member forming a pressure detection passage configured to communicate with the canister passage;
    a switching valve accommodated in the first housing, the switching valve configured to switch selectively between communication of the canister passage with the pressure detection passage and communication of the canister passage with the atmospheric passage;

a pressurizing and depressurizing unit accommodated in the first housing, the pressurizing and depressurizing unit configured to pressurize or depressurize an interior of at least one of the fuel tank and the canister, when the switching valve communicates the canister passage with the pressure detection passage;

a bypass passage formation member configured to form a switching valve bypass passage, which is configured to communicate the canister passage with the pressure detection passage and to bypass the switching valve; and a throttle portion equipped to the bypass passage formation member;

a pressure detection unit configured to detect a pressure in the pressure detection passage and to send a signal according to the pressure in the pressure detection passage as detected;

an air filter accommodated in the second housing, the air filter configured to capture foreign matter, which is contained in air drawn with the pressurizing and depressurizing unit into at least one of the fuel tank and the canister;

a partition member located between the first housing and the second housing, the partition member separating the first interior of the first housing from the second interior of the second housing, the partition member having a communication hole configured to communicate the first interior with the second interior; and a contact member equipped to an end of the partition member, the contact member in contact with at least one of the first housing and the second housing, wherein the partition member forms a clearance with the first housing and the second housing, the first housing has a first flange portion having a first wall surface, the second housing has a second flange portion having a second wall surface, the partition member has a periphery, which is interposed between the first wall surface and the second wall surface, the contact member includes a first seal member and a second seal member, the first seal member is in contact with both the periphery of the partition member and the first wall surface at its entire circumferential periphery, and the second seal member is in contact with both the periphery of the partition member and the second wall surface at its entire circumferential periphery.

2. The fuel vapor leakage detection device according to claim 1, wherein the first connection surface and the second connection surface are in contact with each other selectively at a plurality of portions.

3. A fuel vapor leakage detection device configured to detect leakage of fuel vapor from at least one of a canister and a fuel tank, the canister configured to adsorb fuel vapor in a fuel tank, the fuel vapor leakage detection device comprising:

a first housing having a first interior and a canister passage, the canister passage configured to communicate the first interior with the canister;

a second housing having a second interior, a second connection surface, and an atmospheric passage, the second connection surface connected with a first connection surface of the first housing, the atmospheric passage configured to communicate the second interior with an atmosphere;

a pressure detection passage formation member forming a pressure detection passage configured to communicate with the canister passage;

a switching valve accommodated in the first housing, the switching valve configured to switch selectively between communication of the canister passage with the pressure detection passage and communication of the canister passage with the atmospheric passage;

a pressurizing and depressurizing unit accommodated in the first housing, the pressurizing and depressurizing unit configured to pressurize or depressurize an interior of at least one of the fuel tank and the canister, when the switching valve communicates the canister passage with the pressure detection passage;

a bypass passage formation member configured to form a switching valve bypass passage, which is configured to communicate the canister passage with the pressure detection passage and to bypass the switching valve; and a throttle portion equipped to the bypass passage formation member;

a pressure detection unit configured to detect a pressure in the pressure detection passage and to send a signal according to the pressure in the pressure detection passage as detected;

an air filter accommodated in the second housing, the air filter configured to capture foreign matter, which is contained in air drawn with the pressurizing and depressurizing unit into at least one of the fuel tank and the canister;

a partition member located between the first housing and the second housing, the partition member separating the first interior of the first housing from the second interior of the second housing, the partition member having a communication hole configured to communicate the first interior with the second interior; and a contact member equipped to an end of the partition member, the contact member in contact with at least one of the first housing and the second housing, wherein the partition member forms a clearance with the first housing and the second housing, the first housing has a first flange portion having a first wall surface, the second housing has a second flange portion having a second wall surface, the partition member has a periphery, which is interposed between the first wall surface and the second wall surface, the contact member includes a first seal member and a second seal member, the first seal member is supported by the partition member and is further in contact with the first housing, and the second seal member is supported by the partition member and is further in contact with the second housing.

4. The fuel vapor leakage detection device according to claim 3, wherein the periphery of the partition member has a first groove and a second groove, the first groove is equipped with the first seal member, and the second groove is equipped with the second seal member.

* * * * *